(12) United States Patent
Rozman et al.

(10) Patent No.: US 8,395,873 B2
(45) Date of Patent: Mar. 12, 2013

(54) SSPC WITH DUAL FAULT DETECTORS

(75) Inventors: Gregory I. Rozman, Rockford, IL (US);
Joshua C. Swenson, Rockford, IL (US);
Vietson M. Nguyen, Rockford, IL (US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 317 days.

(21) Appl. No.: 12/797,118

(22) Filed: Jun. 9, 2010

(65) Prior Publication Data

US 2011/0304942 A1 Dec. 15, 2011

(51) Int. Cl.
*H02H 9/02* (2006.01)
*H02H 9/08* (2006.01)

(52) U.S. Cl. .................. 361/101; 361/93.9
(58) Field of Classification Search ............ 361/101, 361/93.9
See application file for complete search history.

(56) References Cited

U.S. PATENT DOCUMENTS

| | | | |
|---|---|---|---|
| 6,052,268 A * | 4/2000 | Thomas | 361/103 |
| 6,246,559 B1 | 6/2001 | Sanders et al. | |
| 7,466,573 B2 | 12/2008 | Kojori et al. | |
| 7,508,642 B2 | 3/2009 | Ye | |
| 7,564,147 B2 | 7/2009 | Michalko | |
| 7,602,228 B2 | 10/2009 | Mazzola et al. | |
| 2002/0080544 A1 * | 6/2002 | Pellegrino | 361/93.9 |
| 2008/0106152 A1 * | 5/2008 | Maier | 307/130 |
| 2008/0204957 A1 * | 8/2008 | Turpin et al. | 361/93.9 |
| 2009/0212726 A1 * | 8/2009 | Baudesson et al. | 318/400.3 |
| 2011/0221404 A1 * | 9/2011 | Rozman et al. | 323/234 |

OTHER PUBLICATIONS

Hamilton Sundstrand Patent Application titled, "Starting/Generating System with Multi-Functional Circuit Breaker," filed Jun. 5, 2009, U.S. Appl. No. 12/479,211.
Mazolla et al., Scalable SiC Power Switches for Applications in More Electric Vehicles, Proc. of 6th International All Electric Combat Vehicle Conf., Jun. 13-16, 2005, AECV, Bath, England.
SemiSouth, Normally-OFF Trench silicon Carbide Power JFET SJEP120R063, May 2009, SemiSouth Laboratories.
Meux, et al., Standardizing solid state electric distribution for a greener and cheaper aircraft, More Electric Aircraft Forum, 2009, Airbus France.

* cited by examiner

*Primary Examiner* — Jared Fureman
*Assistant Examiner* — Scott Bauer
(74) *Attorney, Agent, or Firm* — Cantor Colburn LLP

(57) ABSTRACT

A solid state power controller (SSPC) for a direct current (DC) electrical system includes a high bandwidth fault detector, the high bandwidth fault detector configured to detect a possible fault and place a power switch of the SSPC in saturation at a predetermined current limit; and a low bandwidth fault detector, the low bandwidth fault detector configured to determine whether the possible fault is a confirmed fault, and in the event the possible fault is determined to be the confirmed fault, turning off the power switch, or in the event the possible fault is determined not to be the confirmed fault, turning on the power switch at a minimum on-resistance.

12 Claims, 2 Drawing Sheets

SSPC WITH DUAL FAULT DETECTORS

FIELD OF INVENTION

The subject matter disclosed herein relates generally to the field of solid state power controllers.

DESCRIPTION OF RELATED ART

Solid State Power Controllers (SSPCs) are used in power distribution systems in, for example, the aerospace industry, as an alternative to traditional electromechanical circuit breakers. An SSPC may distribute power to and protect various electrical loads. In comparison to electromechanical devices, SSPCs provide relatively fast response time, and may eliminate arcing during turn-off transient and bouncing during turn-on transient. SSPCs also do not suffer severe degradation during repeated fault isolation in comparison with electromechanical devices. SSPCs may be relatively small in weight and size. SSPCs facilitate advanced protection and diagnostics, allowing for efficient power distribution architectures and packaging techniques. However, fast response to electrical faults in the system while avoiding nuisance trips may be an issue in a power distribution system using SSPCs.

BRIEF SUMMARY

According to one aspect of the invention, a method for fault detection in a direct current (DC) electrical system by a solid state power controller (SSPC), the SSPC comprising a high bandwidth fault detector and a low bandwidth fault detector includes detecting a possible fault by the high bandwidth fault detector; placing a power switch of the SSPC in saturation at a predetermined current limit; determining whether the possible fault is a confirmed fault by the low bandwidth fault detector; in the event the possible fault is determined to be the confirmed fault, turning off the power switch; and in the event the possible fault is determined not to be the confirmed fault, turning on the power switch at a minimum on-resistance.

According to another aspect of the invention, a solid state power controller (SSPC) for a direct current (DC) electrical system includes a high bandwidth fault detector, the high bandwidth fault detector configured to detect a possible fault and place a power switch of the SSPC in saturation at a predetermined current limit; and a low bandwidth fault detector, the low bandwidth fault detector configured to determine whether the possible fault is a confirmed fault, and in the event the possible fault is determined to be the confirmed fault, turning off the power switch, or in the event the possible fault is determined not to be the confirmed fault, turning on the power switch at a minimum on-resistance.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an SSPC with dual fault detectors, and a method of operating an SSPC with dual fault detectors, are provided, with exemplary embodiments being discussed below in detail. Advanced protection requirements in modern electrical systems demand that an SSPC provide near-instantaneous current interruption during fault conditions. A high bandwidth fault detector may be used to improve fault detection speed; however, a high bandwidth detector may be sensitive to noise, which may result in nuisance trips during non-fault conditions. It is desirable to have an SSPC device that may provide fast response to fault conditions while avoiding nuisance trips for a direct current (DC) power distribution system.

Figure 1:
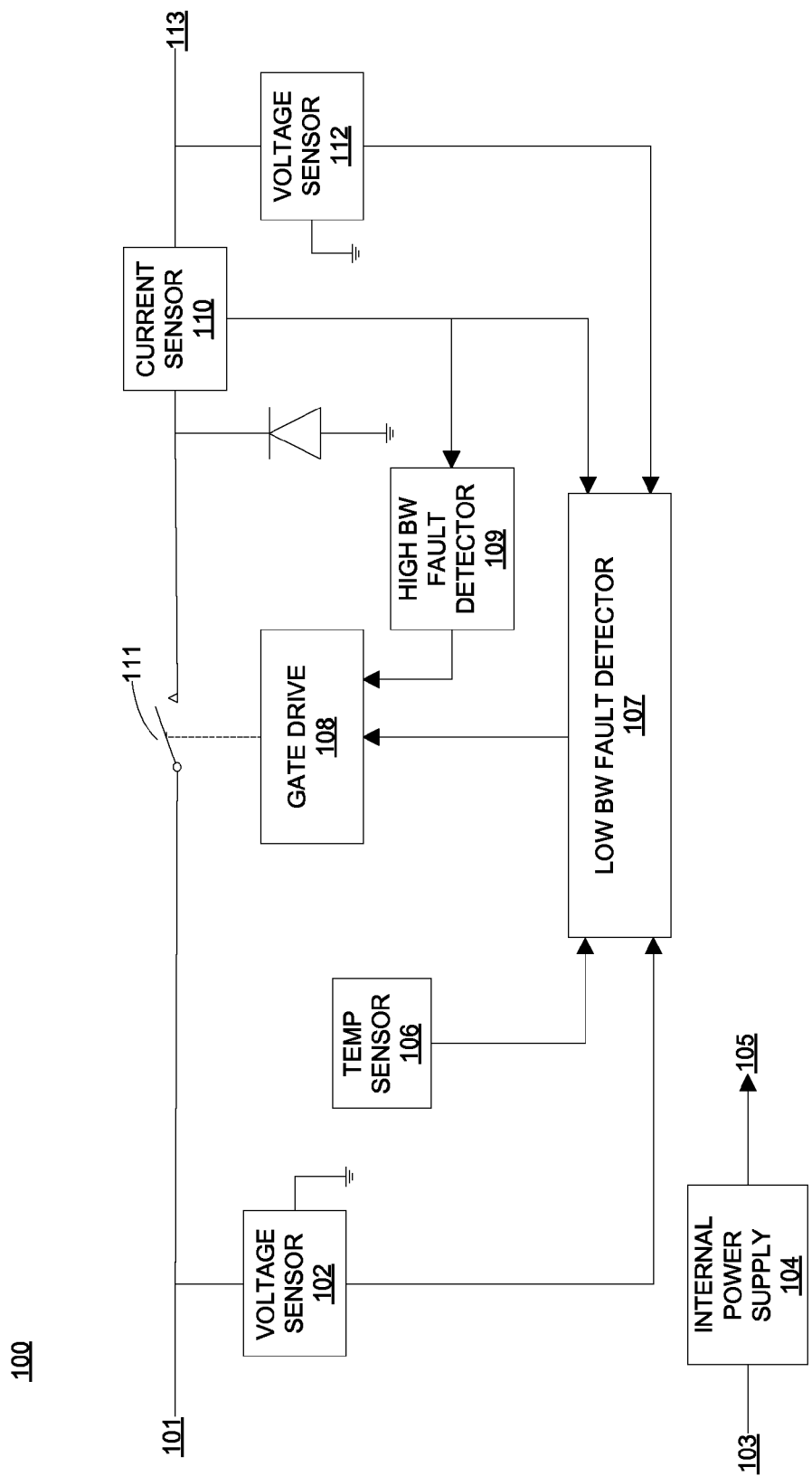
FIG. 1 illustrates an embodiment of an SSPC with dual fault detectors.

FIG. 1 illustrates an embodiment of an SSPC 100 with dual fault detectors. SSPC 100 is connected to a DC power source at input 101, and to a DC load at output 113. SSPC 100 comprises a high bandwidth fault detector 109 and a low bandwidth fault detector 107. High bandwidth fault detector 109 receives input from output current sensor 110, and primarily responds to current-related fault conditions, such as short circuit and parallel arc fault. The low bandwidth fault detector 107 receives input from input voltage sensor 102, output voltage sensor 112, temperature sensor 106, and output current sensor 110. Low bandwidth fault detector 107 may provide fault protection for various types of fault conditions, including series and parallel arc fault protection, $i^2t$ overload, repetitive low overcurrent wire protection, excessive system bus and load ripple protection, and SSPC power switch overtemperature. High bandwidth fault detector 109 and low bandwidth fault detector 107 control power switch 111 via gate drive 108. The various sensors and modules comprising SSPC 100 are powered via output 105 of internal power supply 104, which is connected to an external DC control power source by input 103. The low bandwidth fault detector 107 may be implemented by software executing on a microcontroller in some embodiments, and the high bandwidth fault detector 109 may be implemented in hardware in some embodiments. In some embodiments, high bandwidth fault detector 109 may detect fault conditions within about 2 to 4 microseconds, and the low bandwidth fault detector 107 may detect fault conditions within about 100 to 200 microseconds.

Figure 2:
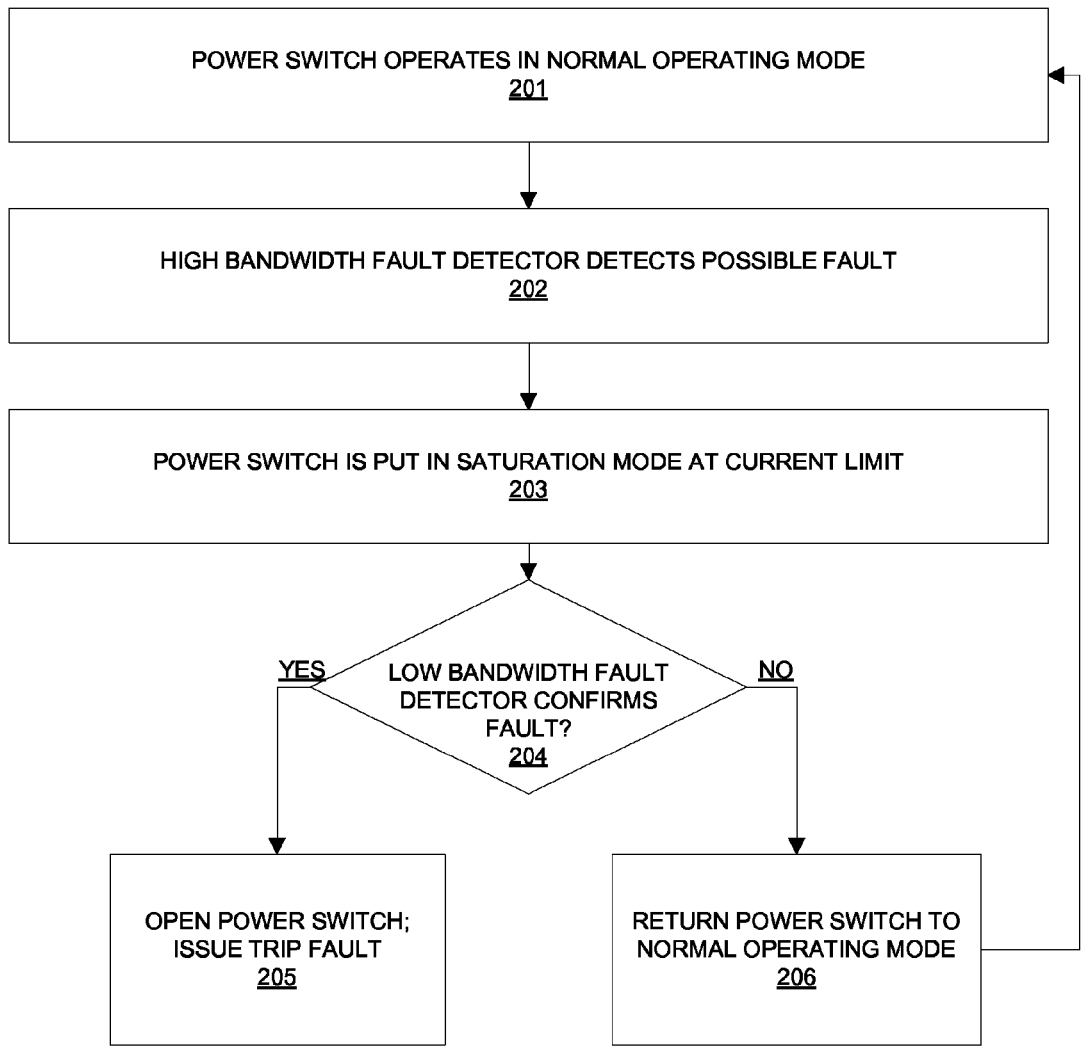
FIG. 2 illustrates an embodiment of a method of operating an SSPC with dual fault detectors.

FIG. 2 illustrates an embodiment of a method of operating an SSPC comprising dual fault detectors. FIG. 2 is discussed with respect to FIG. 1. In block 201, the power switch 111 operates in normal operating mode, at full turn-on voltage and minimum on-resistance. In block 202, the high bandwidth fault detector 109 detects a possible fault based on information from output current sensor 110. In block 203, the high bandwidth fault detector 109 lowers the gate drive voltage of power switch 111 via gate drive 108, causing the power switch 111 to enter saturation at a predetermined current limit, and the saturation time period begins. The predetermined current limit may be based on the maximum current rating of the load connected to output 113, and may be programmable in some embodiments. Power switch 111 may withstand saturation currents for a saturation time limit before failure of power switch 111. Power switch 111 may comprise a silicon carbide (SiC) junction gate field effect transistor (JFET) device in some embodiments, which may have a saturation time limit of up to about a millisecond at elevated case temperatures. Limiting the gate drive voltage to the power switch 111 limits the drain-source current for the power switch 111. The gate drive voltage for the power switch 111 may be controlled by both the low bandwidth fault detector 107 and the high bandwidth fault detector 109, while on/off switching of the power switch 111 is primarily controlled by the low bandwidth fault detector 107.

In block 204, the low bandwidth fault detector 107 confirms whether the fault detected in block 202 actually exists based on information from input voltage sensor 102, output voltage sensor 112, temperature sensor 106, and output current sensor 110. This determination may be triggered based on the power switch 111 entering saturation in block 203. If the low bandwidth fault detector 107 confirms the fault, the low bandwidth fault detector 107 causes power switch 111 to open (i.e., turns off power switch 111) via gate drive 108 in block 205, and issues a trip fault. In some embodiments, the low bandwidth fault detector 107 may cause the power switch 111 to provide temporary current limiting at saturation at the predetermined current level for a period prior to turning the power switch 111 off In block 206, if low bandwidth fault detector 107 does not confirm the fault detected in block 202, the power switch 111 is returned to normal operating mode at full turn-on voltage level and minimum on-resistance and flow returns to block 201. Blocks 204 and 205 or 206 may be completed before expiration of the saturation time limit of power switch 111. In some embodiments, the low bandwidth fault detector 107 may cause the power switch 111 to provide temporary current limiting at saturation at the predetermined current limit up to the saturation time limit prior to turning the power switch 111 off.

The technical effects and benefits of exemplary embodiments include relatively fast response to fault conditions in a DC electrical system by an SSPC while avoiding nuisance trips.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for fault detection in a direct current (DC) electrical system by a solid state power controller (SSPC), the SSPC comprising a high bandwidth fault detector and a low bandwidth fault detector, the method comprising:

detecting a possible fault by the high bandwidth fault detector, wherein the high bandwidth fault detector detects the possible fault based on information from an output current sensor that is located between a power switch of the SSPC and an SSPC output, the SSPC output being connected to a DC load, and the power switch being located between the SSPC output and a DC power source input of the SSPC;

placing the power switch of the SSPC in saturation at a predetermined current limit based on the possible fault;

determining whether the possible fault is a confirmed fault by the low bandwidth fault detector, wherein the low bandwidth fault detector determines whether the possible fault is the confirmed fault based on information from each of an input voltage sensor configured to determine a voltage at the DC power source input, an output voltage sensor configured to determine a voltage at the SSPC output, a temperature sensor of the SSPC, and the output current sensor;

in the event the possible fault is determined to be the confirmed fault, turning off the power switch; and in the event the possible fault is determined not to be the confirmed fault, turning on the power switch at a minimum on-resistance.

2. The method of claim 1, wherein the predetermined current limit is determined based on a current limit of the DC load attached to the SSPC output.

3. The method of claim 1, wherein power switch is either turned on or turned off before an elapsing of a saturation time limit of the power switch.

4. The method of claim 1, further comprising, in the event the possible fault is determined to be the confirmed fault, operating the power switch at saturation until an elapsing of a saturation time limit of the power switch before turning off the power switch.

5. The method of claim 1, wherein the power switch comprises a silicon carbide (SiC) junction gate field effect transistor (JFET).

6. The method of claim 1, wherein the low bandwidth fault detector is implemented in software, and the high bandwidth fault detector is implemented in hardware.

7. A solid state power controller (SSPC) for a direct current (DC) electrical system, comprising:

a DC power source input;

a SSPC output, the SSPC output being connected to a DC load;

a power switch located between the DC power source input and the SSPC output;

an output current sensor located between the power switch and the SSPC output;

an input voltage sensor configured to determine a voltage at the DC power source input;

an output voltage sensor configured to determine a voltage at the SSPC output;

a temperature sensor;

a high bandwidth fault detector, the high bandwidth fault detector configured to detect a possible fault and place the power switch of the SSPC in saturation at a predetermined current limit based on the possible fault, wherein the high bandwidth fault detector is configured to detect the possible fault based on information from the output current sensor; and the low bandwidth fault detector, the low bandwidth fault detector configured to determine whether the possible fault is a confirmed fault, and in the event the possible fault is determined to be the confirmed fault, turning off the power switch, and in the event the possible fault is determined not to be the confirmed fault, turning on the power switch at a minimum on-resistance, wherein the low bandwidth fault detector is configured to determine whether the possible fault is the confirmed fault based on information from each of the input voltage sensor, the output voltage sensor, the temperature sensor, and the output current sensor.

8. The SSPC of claim 7, wherein the predetermined current limit is determined based on a current limit of the DC load attached to the SSPC output.

9. The SSPC of claim 7, wherein power switch is either turned off or turned on before an elapsing of a saturation time limit of the power switch.

10. The SSPC of claim 7, further comprising, in the event the possible fault is determined to be the confirmed fault, operating the power switch at saturation at the predetermined current limit until an elapsing of a saturation time limit of the power switch before turning off the power switch.

11. The SSPC of claim 7, wherein the power switch comprises a silicon carbide (SiC) junction gate field effect transistor (JFET).

12. The SSPC of claim 7, wherein the low bandwidth fault detector is implemented in software, and the high bandwidth fault detector is implemented in hardware.

* * * * *